Figure 1:
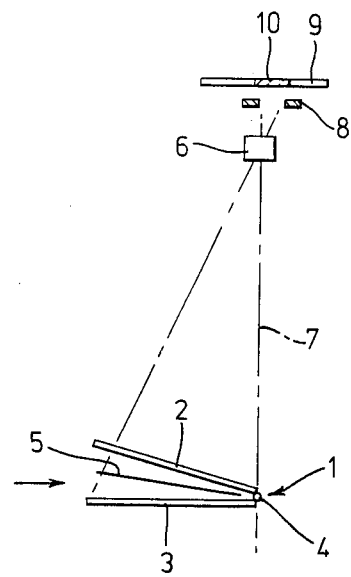

United States Patent [19]

Spence-Bate

[11] 4,125,324

[45] Nov. 14, 1978

[54] COPYING APPARATUS

[76] Inventor: Harry A. H. Spence-Bate, 1 Cheam Place, Morley, Australia, 6062

[21] Appl. No.: 812,371

[22] Filed: Jul. 1, 1977

[30] Foreign Application Priority Data

Jul. 2, 1976 [AU] Australia ............................. PC6519

[51] Int. Cl.² ....................... G03B 27/32; G03B 27/52
[52] U.S. Cl. .......................................... 355/23; 355/64
[58] Field of Search ...................... 355/75, 76, 72, 74, 355/64, 23, 24, 77

[56] References Cited

U.S. PATENT DOCUMENTS

| | | | |
|---|---|---|---|
| 2,296,655 | 9/1942 | Stuart | 355/54 X |
| 2,443,281 | 6/1948 | Terry | 355/24 X |
| 2,682,193 | 6/1954 | Schubert et al. | 355/77 |
| 3,442,588 | 5/1969 | Squassoni et al. | 355/54 |
| 3,675,999 | 7/1972 | Komori et al. | 355/23 X |
| 4,035,073 | 7/1977 | Del Vecchio | 355/24 |

FOREIGN PATENT DOCUMENTS 683,120 2/1930 France ....................... 355/23

1,043,639 6/1953 France ....................... 355/23

*Primary Examiner*—Donald A. Griffin
*Attorney, Agent, or Firm*—Fidelman, Wolffe & Waldron

[57] ABSTRACT

Copying apparatus for copying both sides of a record which is placed for copying between two transparent sheets mounted in the front focal plane of a lens system of the apparatus, the sheets are pivotal about a hinge axis adjacent one side of the sheets, the sheets being rotatable through at least 90° about the hinge axis which is in or to one side of an optical axis of the lens system. To copy the reverse of the record the sheets are turned through 90° and in one embodiment where the hinge axis is in the optical axis a masking means having two apertures one on one side and the other on the other side of the optical axis shifts to record the reverse; in another embodiment where the hinge axis is to one side of the optical axis the hinge axis is shifted from the one side to the other of the optical axis. The sheets can be rotated about an axis in or parallel to the optical axis so that the sheets may be turned about a top or side of the record for "normal" or "tumble" turnings.

9 Claims, 10 Drawing Figures

COPYING APPARATUS

The present invention relates to devices for copying both sides of a single sheet of data. The device has been designed particularly for a microfiche camera, but is applicable for copying machines using xerographic or other copying methods.

In present copying machines the operator is required to manually turn a sheet of data, referred to hereafter as a record, so that the reverse may be copied. This manual operation is tiring, and may be subject to error in aligning the reverse with the position in which the obverse was aligned during the first copying stage. Normally, records with data recorded on the obverse and the reverse have the information recorded the same way up, thus such a record is turned to view the other side by turning about an axis parallel to the sides of the record. This method of turning will be referred to as "normal turning". Some records, however, have the information recorded on the obverse, one way up, and on the reverse, the opposite way up. These latter records are turned about an axis parallel to the top or bottom of the record, and will be referred to as "tumble-turned".

It is an object of the present invention to provide a device for copying both sides of a record comprising two transparent sheets of material hinged at a hinged axis at, or adjacent, one side of the sheets, so as to hold a record between the sheets, the sheets being rotatable through at least 90° about the hinged axis, which is in or to one side of an optical axis of a copying lens or lens system of a copying machine, the hinged axis being located so that the record may be held in the front focal plane of the copying lens or lens system.

In one embodiment of the invention, where the hinge axis is in the optical axis, the lens or lens system is provided with a masking device, arranged to open an aperture to one side of the optical axis for recording the obverse of the record, and to open an aperture at the other side of the optical axis to record the reverse of the record.

In another embodiment of the invention, the record is located by the transparent sheet centrally of the optical axis and the hinge axis is located at one side of the optical axis for recording the obverse of the record, and is moved to the other side of the optical axis for recording the reverse of the record. In the second embodiment, the copying lens or lens system is provided with a mask located centrally with the optical axis.

In a further embodiment of the invention, the transparent sheets of material are pivotally mounted about an axis in or parallel to the optical axis, so that the hinge axis may be rotated through 90° so as to turn the record about an axis parallel with the top of the record.

Further transparent sheets may be hinged about the hinge axis so as to enable a further record to be inserted in the device whilst a first record is being copied.

The masking device may comprise a slide, having one or more apertures mounted on a mask disc, pivotal about an axis parallel to the optical axis, and located between the lens or lens system and a carrier for carrying a recording medium.

Figure 2:
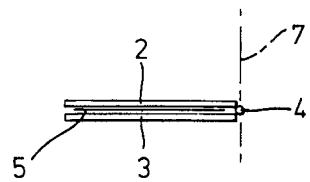
Figure 3:
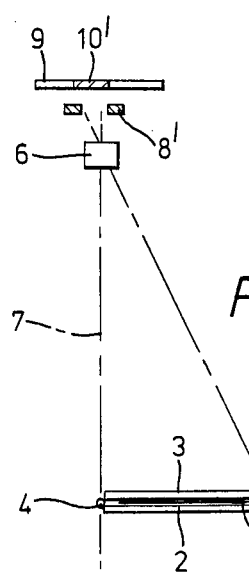
Figure 4:
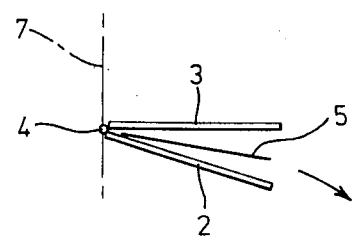
Figure 5:
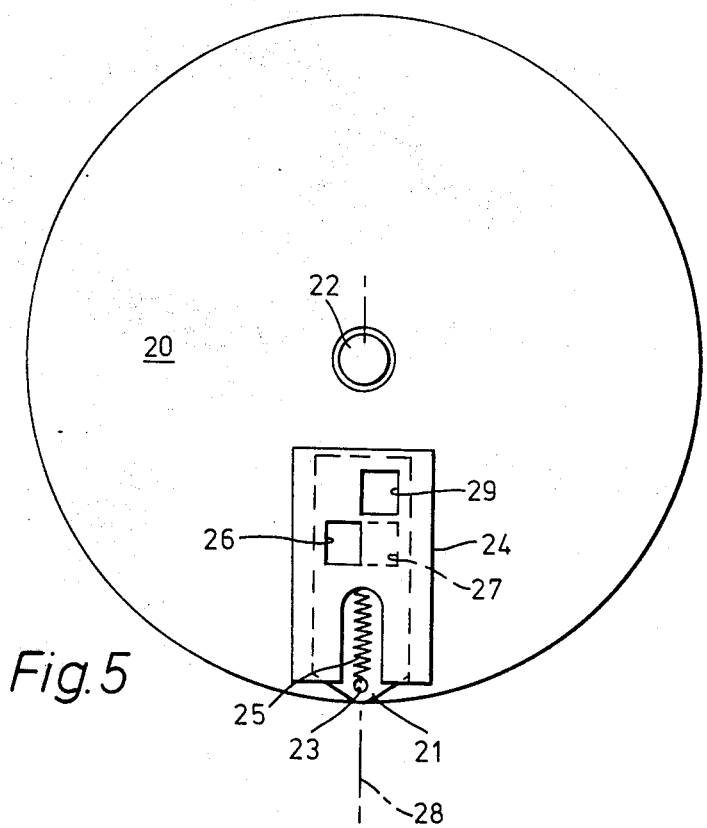
Figure 6:
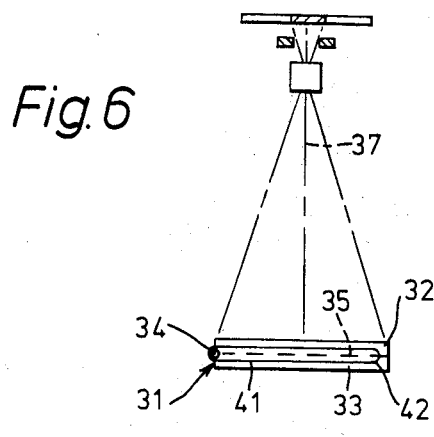
Figure 7:
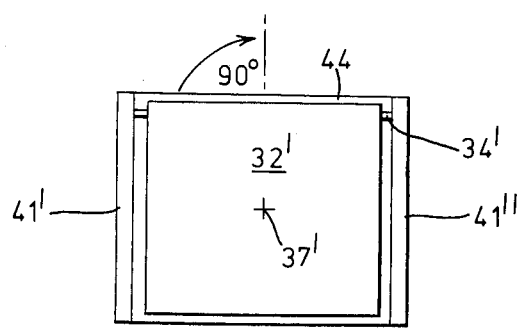
Figure 8:
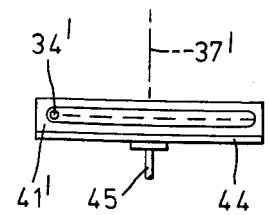
Figure 9:
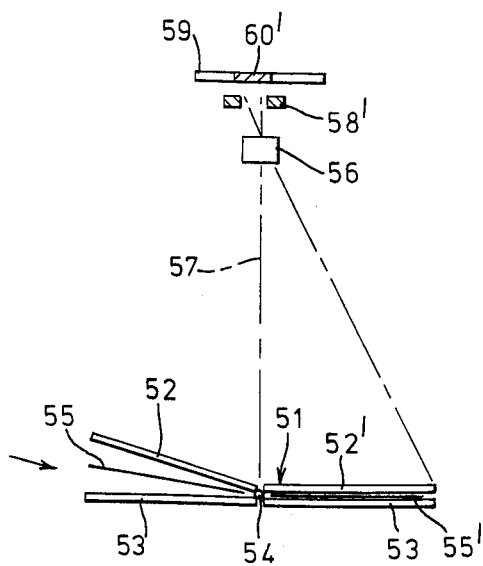
Figure 10:
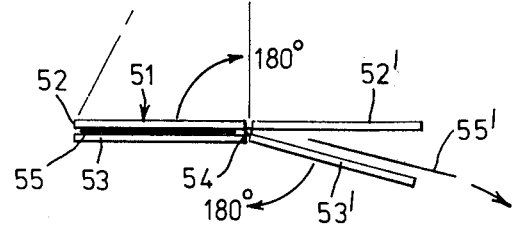

The invention will now be described with reference to the accompanying drawings in which:

FIG. 1 shows diagrammatically a first embodiment of a device for copying according to the invention, FIG. 2 shows part of the device of FIG. 1, with a record held between the two transparent sheets of material for copying the obverse of the record, FIG. 3 shows the device of FIG. 1 in a position for copying the reverse of the record, FIG. 4 shows the device of FIG. 1 when copying has been completed and releasing the record, FIG. 5 shows a masking device for the device of FIG. 1, FIG. 6 shows diagrammatically a second embodiment of a device according to the invention, in which the device is centred on the optical axis, FIG. 7 shows a diagrammatic plan view of the third embodiment of the invention arranged for tumble-turning, FIG. 8 shows a diagrammatic side view of the device of FIG. 7, FIG. 9 shows a further embodiment of the invention with two pairs of transparent sheets for holding a record to be copied, and FIG. 10 shows the next sequence in operation of the device shown in FIG. 9.

In FIG. 1 there is shown diagrammatically a copying machine, which may be a microfiche camera. The machine has a normal turn device 1 which consists of two glass plates 2 and 3 pivotted at a hinge point 4. The plates 2 and 3 are pivotable to allow a record 5 to be inserted between them.

Above the device 1 is a copying lens or lens system 6 which is positioned in the optical axis 7 above the hinge point 4. Positioned adjacent the lens 6 is a mask 8 which is movable across the optical axis 7 from the position shown in FIG. 1 to the position 8' shown in FIG. 3. Though it will be appreciated from a further arrangement described that mask 8' can be a separate mask from mask 8. The mask or masks should be at or nearly at the back-focal point of the lens or lens system 6 as should also the film or recording medium 9 although this is shown as being separated from the mask for ease of illustration.

In FIG. 2 the device 1 is shown closed to trap the record and the copying machine is activated to record the image of record 5 on the recording medium 9 in a frame 10. The frame 10 is offset to the right of the axis 7. When the copying machine is a microfiche camera the frame 10 conveniently forms half a double-fiche frame, as is disclosed in my U.S. Pat. No. 4,027,968.

After the image of record 5 is recorded on recording medium 9 in frame 10, the device 1 is pivotted about 4 to the position shown in FIG. 3. At the same time the mask 8 is shifted to the left of the axis 7 or, as in the case of a separate mask, a new mask 8' is brought into the position to the left of the axis 7. The copying machine is again activated and an image of the reverse side of record 5 is recorded in frame 10' on the medium 9. In the case of a double-fiche frame, the frame 10' forms the remaining part of the double-fiche frame.

After recording in frame 10', the record 5 is released from the copying machine by lowering plate 2 so that the record 5 falls out. The device 1 is then returned to the position of FIG. 1 or FIG. 2, either by continued turning of the device 1 in the same direction as it was turned from the position of FIG. 2 to the position FIG. 3, or by turning the device 1 in a reverse direction.

It will be appreciated that by turning the hinge axis 4 through 90° a tumble-turn device can be provided, but the masking arrangements would also have to be changed.

One suitable arrangement for masking is shown in FIG. 5, where a mask disc 20 similar to the mask disc of my U.S. Pat. No. 4,027,968 is provided. A slide 21, shown in the inner position, is movable radially from the disc axis by means of a pawl, shown in the said U.S. Patent which engages in hole 23 to pull the slide 21 in the slide frame 24 against weak spring 25 to an outer position. In the inner position the mask aperture 26 in the slide corresponds with half of an aperture 27 in the mask disc, and this allows an aperture equivalent to frame 10 in FIG. 1 to be opened for recording the obverse of the record when the mask axis 28 is rotated to intersect the optical axis equivalent to axis 7 in FIG. 1. When the reverse of the record is to be recorded the slide 21 is pulled by the pawl to the outer position, so that aperture 29 in the slide 21 corresponds with the other half of aperture 27. This allows an aperture equivalent to frame 10' in FIG. 1 to be opened.

The arrangement shown in FIG. 5 has the advantage that several formats such as NMA or COSSATI can be accomodated on one disc by providing further slides on the discs. Also, slides for the same format but for single or double fiche for single side copying can be provided.

In FIG. 6 an alternative arrangement to FIG. 1 is provided in which a normal turn device 31, similar to device 1, is hinged at 34. The hinge axis 34 is slidable in a slide 41 across the optical axis 37 so that the obverse of record 35 held between glass plates 32 and 33 pivotted at 34, can be recorded with its centre in the optical axis 37. When the reverse of record 35 is to be recorded, the hinge point 34 is moved to the right of the slide 41 to position 42 and the plates 32 and 33 are simultaneously turned through 90° to place the reverse of the record uppermost and its centre again centred in the optical axis 37. In this way a masking arrangement the same as shown in the aforesaid U.S. Patent can be used. This enables more formats with, if required, single or double fiche recordings to be made than the arrangement shown in FIG. 5.

In another embodiment of the invention, shown in FIGS. 7 and 8, a device similar to the device shown in FIG. 6 is provided, having slides 41' and 41" mounted on a base 44. The base 44 is in turn mounted on a pivot 45 whose axis is in the optical axis 37' centred on the plates of the device, the top one 32' is shown in FIG. 7.

In a further embodiment of the invention shown in FIG. 9, two pairs of transparent plates 52, 53 and 52', 53' are hinged at a common axis 54. The transparent plates are enabled for complete 360° rotation.

In FIG. 9 it will be seen that record 55' is being copied in frame 60' (in the same way that copying is carried out in frame 10' in FIG. 3). Meanwhile, plate 52 of the left hand pair of plates is open to receive the next record 55 to be copied. When record 55' is copied as is shown in FIG. 10, the lower plate of the right hand pair of plates drops to release record 55', and plate 52 of the left hand pair lowers to trap record 55. The recording medium 59 is then shifted to place frame 61 in line with mask 58 which replaces mask 58'. Record 55 is then copied, whereupon the whole device 51 is rotated through 180°. This brings plate 53' to the position of 52 in FIG. 9, and 52' to the position of 53 in FIG. 9. Thus 53' is already lifted to allow a further record to be inserted in the device, and record 55 is normal turned for recording its reverse. This is done when mask 58' is brought into play and so on.

The advantage of the FIG. 9/FIG. 10 embodiment is that a continuous flow of two-sided records can be copied, reducing the time taken over the arrangement of FIG. 1.

The disadvantage of the FIG. 9 embodiment is that it is more difficult to mount for swivelling for tumble-turning, and the device is bulkier for mounting in a copying machine.

I claim:

1. Copying apparatus for copying both sides of a record including a copying lens system, at least two transparent sheets of material hinged at a hinge axis adjacent one side of the sheets so as to hold a record between two of the sheets, said sheets being rotatable as a pair through at least 90° about said hinge axis, said hinge axis being in an optical axis of said copying lens system, said sheets being arranged to hold a said record in the front focal plane of said copying lens system, and a masking device disposed between said copying lens system and the back focal plane of said lens system, said masking device comprising masking means defining a masking aperture with one edge of said aperture being aligned with said optical axis, and said masking means being arranged to be movable across said optical axis.

2. Apparatus according to claim 1 wherein said masking means defines two masking apertures each having an edge aligned with said optical axis, one of the apertures being to one side of the optical axis for recording the obverse of the record and the other of the apertures being to the other side of the optical axis for recording the reverse side of the record.

3. Apparatus according to claim 2 wherein the masking means is rotably mounted on a mask disc about an axis parallel with and offset from said optical axis.

4. Apparatus according to claim 1 wherein said sheets are pivotally mounted about an axis in or parallel to said optical axis so that the hinge axis may be rotated through 90° to turn the record about an axis parallel with the top of the record.

5. Apparatus according to claim 1 wherein four said transparent sheets are mounted as two pairs on said hinge axis.

6. Copying apparatus for copying both sides of a record including a copying lens system, at least two transparent sheets of material hinged on a hinge axis adjacent one side of the sheets so as to hold a record between two of the sheets, said hinge axis being to one side of an optical axis of said copying lens system and slidable across the optical axis, said sheets being rotatable as a pair through at least 90° about said hinge axis as said hinge axis slides across the optical axis, and said sheets being arranged to hold said record in the front focal plane of said copying lens system.

7. Apparatus according to claim 6 wherein said hinge axis is mounted for movement across said optical axis.

8. Apparatus according to claim 6 wherein said sheets are pivotally mounted about an axis in or parallel to said optical axis so that the hinge axis may be rotated through 90° to turn the record about an axis parallel with the top of the record.

9. Apparatus according to claim 6 wherein four said transparent sheets are mounted as two pair on said hinged axis.

* * * * *